United States Patent
Tsontakis

(10) Patent No.: US 6,837,149 B1
(45) Date of Patent: Jan. 4, 2005

(54) ROTISSERIE DEVICE COMPRISING A TILTABLE SPIT

(75) Inventor: Haridimos Tsontakis, Montréal (CA)

(73) Assignee: Canada Inc., Montreal (CA)

( * ) Notice: Subject to any disclaimer, the term of this patent is extended or adjusted under 35 U.S.C. 154(b) by 0 days.

(21) Appl. No.: 10/703,442

(22) Filed: Nov. 10, 2003

(51) Int. Cl.[7] ............................. A47J 37/00; A47J 37/04
(52) U.S. Cl. ........................ 99/339; 99/419; 99/421 V; 99/446
(58) Field of Search .................. 99/339, 340, 352–355, 99/357, 400, 401, 443 R, 443 C, 419–421 V, 444–446, 447–450, 482; 126/41 R, 25 R; 426/523

(56) References Cited

U.S. PATENT DOCUMENTS

| | | | | |
|---|---|---|---|---|
| 2,001,116 A | * | 5/1935 | Smith .......................... | 40/431 |
| 2,179,646 A | | 11/1939 | Spartalis | |
| 2,482,601 A | | 9/1949 | Spartalis | |
| 2,687,080 A | | 8/1954 | Dorin | |
| 3,604,341 A | | 9/1971 | Coroneos | |
| 4,512,248 A | | 4/1985 | Volakakis | |
| 4,590,848 A | | 5/1986 | Willingham | |
| 5,030,472 A | * | 7/1991 | Logan, Jr. .................. | 426/641 |
| 5,101,715 A | * | 4/1992 | Liu ........................... | 99/421 V |
| 5,193,443 A | * | 3/1993 | Carney ........................ | 99/419 |
| 5,251,543 A | * | 10/1993 | Brothers ....................... | 99/538 |
| 5,357,853 A | | 10/1994 | Nelson et al. | |
| 5,490,451 A | * | 2/1996 | Nersesian ..................... | 99/420 |
| 5,575,196 A | * | 11/1996 | Masel et al. .............. | 99/421 V |
| 5,845,563 A | | 12/1998 | Haring et al. | |
| 5,907,994 A | | 6/1999 | Dotan | |
| 6,047,633 A | * | 4/2000 | Khaytman ................ | 99/421 V |
| 6,269,740 B2 | * | 8/2001 | Kojs ........................... | 99/537 |
| 6,484,627 B1 | * | 11/2002 | Peter ........................... | 99/538 |

* cited by examiner

Primary Examiner—Timothy F. Simone
(74) Attorney, Agent, or Firm—Francois Martineau

(57) ABSTRACT

A rotisserie device for roasting meats, comprising a casing and a spit rotatably mounted to the casing. The casing comprises a vertical main portion, and a horizontal base perpendicularly attached to and extending beyond the vertical main portion. The horizontal base is provided with a residue-collecting drawer underlying the spit for collecting cooking residues. The vertical main portion of the casing comprises heating elements thereon, and also comprises top and bottom elongated tracks, to which are rollingly mounted a top spit attachment assembly and a bottom rolling member, respectively. The spit rotatably engages the top spit attachment assembly at its top end, and rotatably engages the bottom rolling member at its bottom end. By rollingly displacing the top spit attachment assembly about the top elongated track and the bottom rolling member about bottom elongated track, the spit can be tilted and/or translated relative to the heating elements of the device.

11 Claims, 5 Drawing Sheets

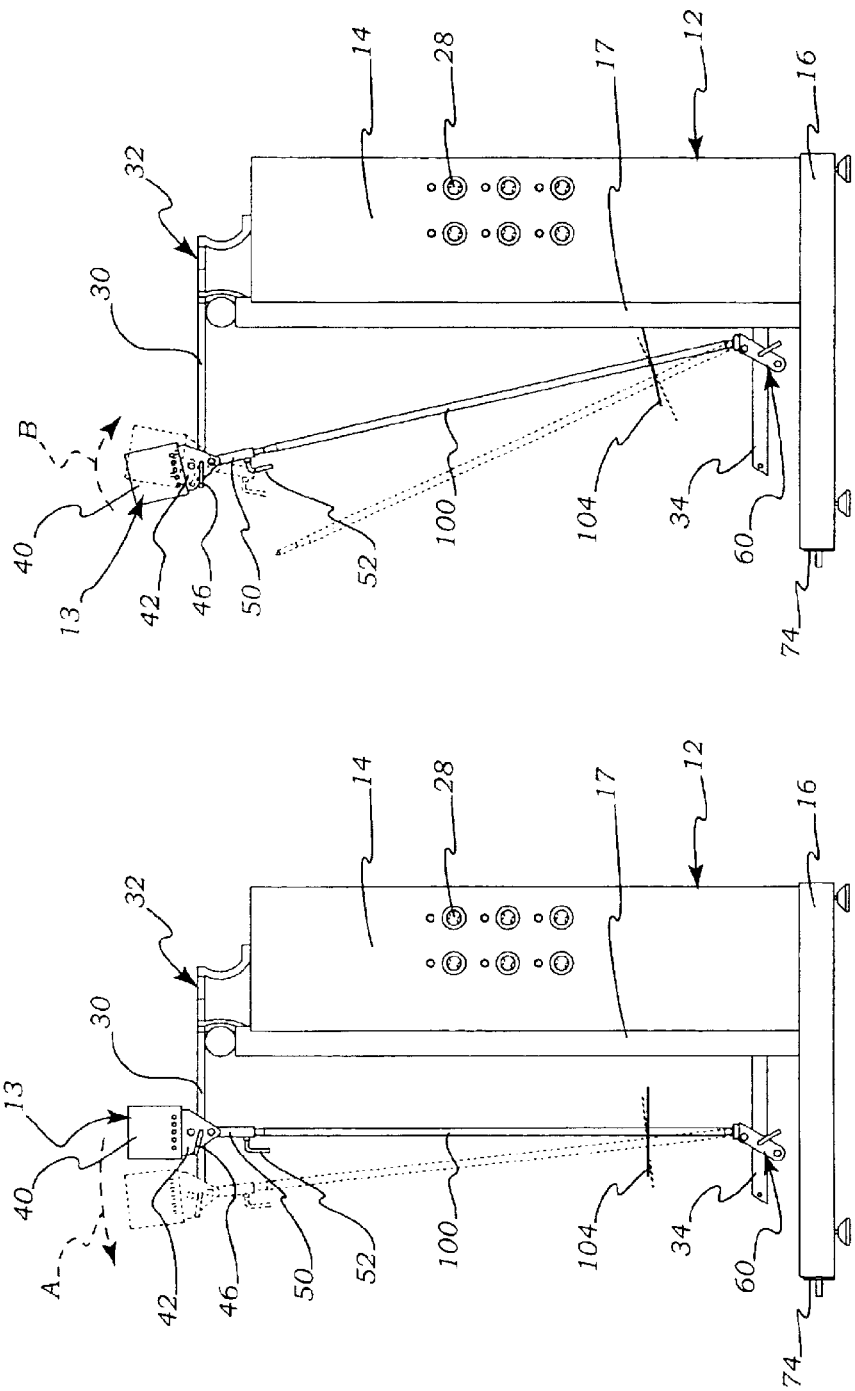

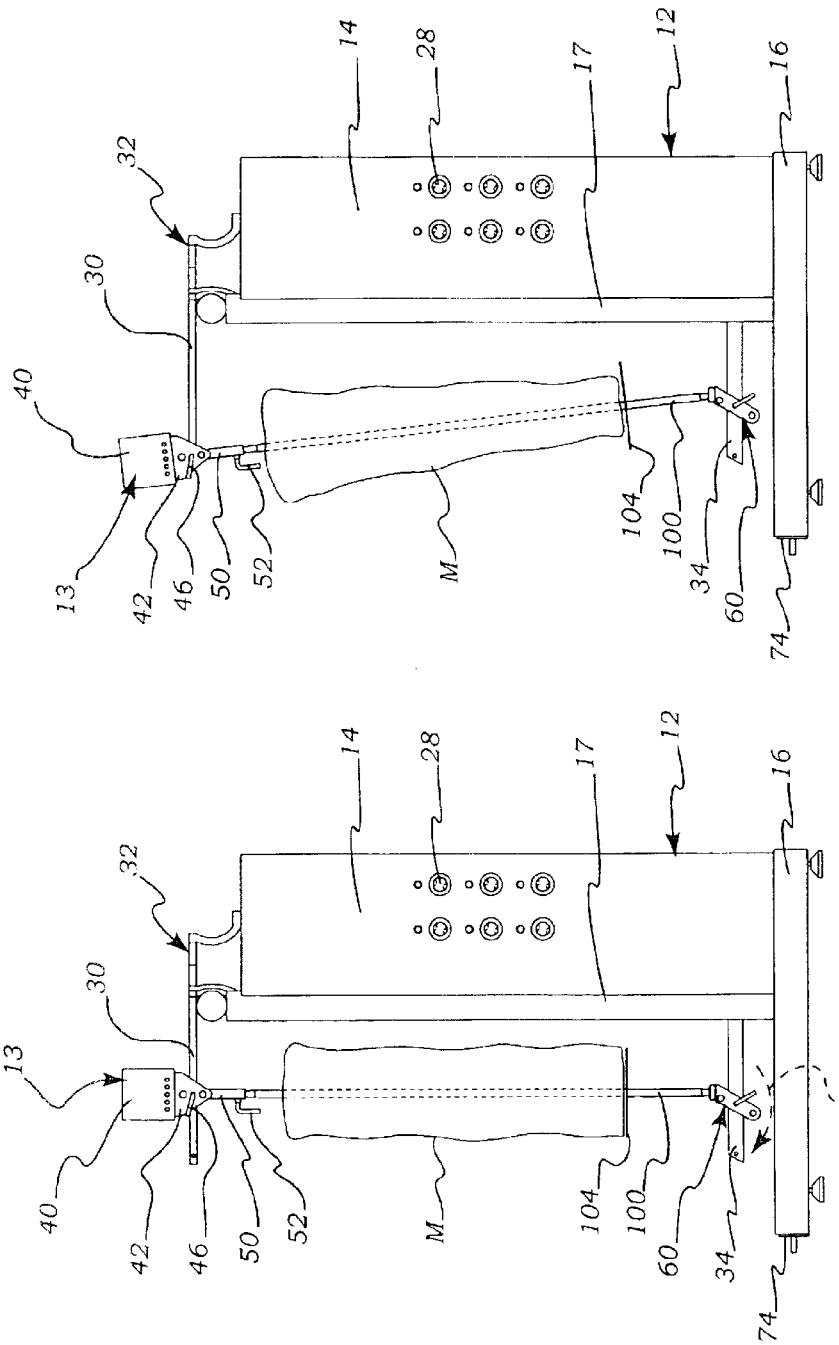

ROTISSERIE DEVICE COMPRISING A TILTABLE SPIT

FIELD OF THE INVENTION

This invention relates generally to meat cooking appliances, and more particularly to a rotisserie device comprising a rotatable spit which can be tilted relative to the heating elements of the device.

BACKGROUND OF THE INVENTION

Rotisserie devices comprising a vertical rotatable spit are commonly used in restaurants to roast food products, typically meat. These rotisserie devices generally comprise a vertical rotatable spit, on which meat is skewered to form a stacked meat piling; these devices also comprise heating elements located adjacent the rotatable spit. In use, once the meat has been skewered on the spit, the heating elements are adjusted to release a selected amount of heat, and the spit is slowly rotated adjacent the heating elements to cook the meat. Such rotisserie devices are typically used in specialty restaurants, of the type serving Gyro-style or Shish-Taouk style meat sandwiches for example.

A cook, or the like food preparer, skewering meat on a vertical prior art spit will try to keep the resulting meat piling as cylindrical as possible, in order for the outer face of the meat piling to be as straight and vertical as possible. Therefore, the same amount of heat is distributed all around the revolving meat piling, and it can be uniformly cooked by the vertically disposed heating elements.

When it is desired to prepare a meat serving from the meat piling, the cook uses a sharp knife to shave or carve thin portions of meat from the body of the meat piling. However, when a cook prepares meat servings, he is generally pressed for time, and cannot afford to see to it that the meat piling remains substantially cylindrical. Indeed, some areas of the meat piling will be barely carved by the cook to prepare servings, and thus stays close to the heating elements, while other areas are repeatedly carved to prepare meat servings, and thus become more distant relative to the heating elements as the amount of meat servings carved from the meat piling increases. Typically, after a substantial number of meat servings have been prepared, the meat piling becomes inversely conical, and it no longer receives heat from the heating elements homogeneously all around it. This can cause food losses, since the meat piling portion which remains close to the heating elements is overexposed to heat, and thus dries out or carbonizes, and has to be disposed of.

Moreover, the meat skewering process can be inconvenient on traditional rotisserie devices. With known devices, the cook must first fully detach the spit from the rotisserie device, and then impale and stack pieces of meat on the spit. Thereafter, the cook must reattach the meat-loaded spit on the rotisserie device, one end at a time. This process can be arduous, as the meat-loaded spit can have a considerable mass.

SUMMARY OF THE INVENTION

The present invention relates to a rotisserie device for cooking meat, comprising:
  a casing;
  at least one heating element mounted to a heating surface of said casing;
  an elongated rotatable spit located in spaced facing register with said heating surface, said spit defining opposite first and second end portions;
  a first joint member carried by said casing and movable along a first axis towards and away from said heating elements, and pivotable about a second axis perpendicular to said first axis, said spit front end portion being rotatably carried by said first joint member; and
  a second joint member carried by said casing and movable along a third axis towards and away from said heating surface, said third axis being parallel to said first axis, said second joint member being pivotable about a fourth axis perpendicular to said third axis and parallel to said second axis, said spit second end portion being rotatably carried by said second joint member.

In one embodiment, the rotisserie device further comprises a power device operatively connected to said spit, wherein said power device can be selectively activated for driving said spit into rotation.

In one embodiment, said casing further comprises first and second spaced-apart tracks, extending along said first and third axes respectively, said first track slidably carrying said first joint member, and said second track slidably carrying said second joint member.

In one embodiment, the rotisserie device further comprises first and second rolling members, said first joint member being attached to said first rolling member and said first rolling member rollingly and slidably engaging said first track, said second joint member being attached to said second rolling member and said second rolling member rollingly and slidably engaging said second track.

In one embodiment, said spit further comprises a platter attached to an intermediate portion thereof in a perpendicular fashion, for longitudinally supporting food skewered on said spit.

In one embodiment, said casing comprises a residue-collecting drawer underlying said spit, for collecting cooking residues.

The present invention also relates to a rotisserie device for cooking meat, comprising:
  a casing;
  first and second parallel elongated guiding tracks protruding from and attached to said casing;
  a first joint member and a second joint member, said first joint member displaceably engaging said first guiding track, and said second joint member displaceably engaging said second guiding track;
  a number of heating elements mounted to said casing;
  an elongated spit defining a first end and a second end, said spit first end rotationally connected to said casing at said first joint member, and said spit second end rotationally connected to said casing at said second joint member, said spit being rotationally mounted to said casing in facing register with said heating elements;
wherein said first joint member can be displaced about said first guiding track, and said second joint member can be displaced about said second guiding track, in order to displace said spit relative to said casing.

In one embodiment, the rotisserie device further comprises a motor operatively connected to said spit, wherein said motor can be selectively activated to drive said spit into slow rotary motion.

In one embodiment, the rotisserie device further comprises first and second rolling members, said first joint member being attached to said first rolling member and said first rolling member rollingly engaging said first track, said second joint member being attached to said second rolling member and said second rolling member rollingly engaging said second track.

In one embodiment, said spit further comprises a platter attached to an intermediate portion thereof in a perpendicular fashion, for longitudinally supporting food skewered on said spit.

In one embodiment, said casing comprises a residue-collecting drawer underlying said spit, for collecting cooking residues.

DESCRIPTION OF THE DRAWINGS

In the annexed drawings:

FIG. 5 shows a side elevation of the rotisserie device of FIG. 1 with the spit being in an upright position, and showing in dotted lines the spit in an alternate tilted position, with an arrow suggesting the displacement of the top spit attachment assembly along the top guiding track;

FIG. 6 shows a side elevation of the rotisserie device of FIG. 1 with the spit in a tilted position, and further showing in dotted lines the spit in an alternate position in which it is released from the top spit attachment assembly;

FIG. 7 shows a side elevation of the rotisserie device of FIG. 1, with the spit being in an upright position, with a quasi-cylindrical meat piling being skewered thereon; and FIG. 8 shows a side elevation of the rotisserie device of FIG. 1, with the spit being in a tilted position, with an inversely conical meat piling being skewered thereon.

DETAILED DESCRIPTION OF THE EMBODIMENTS

Figure 1:
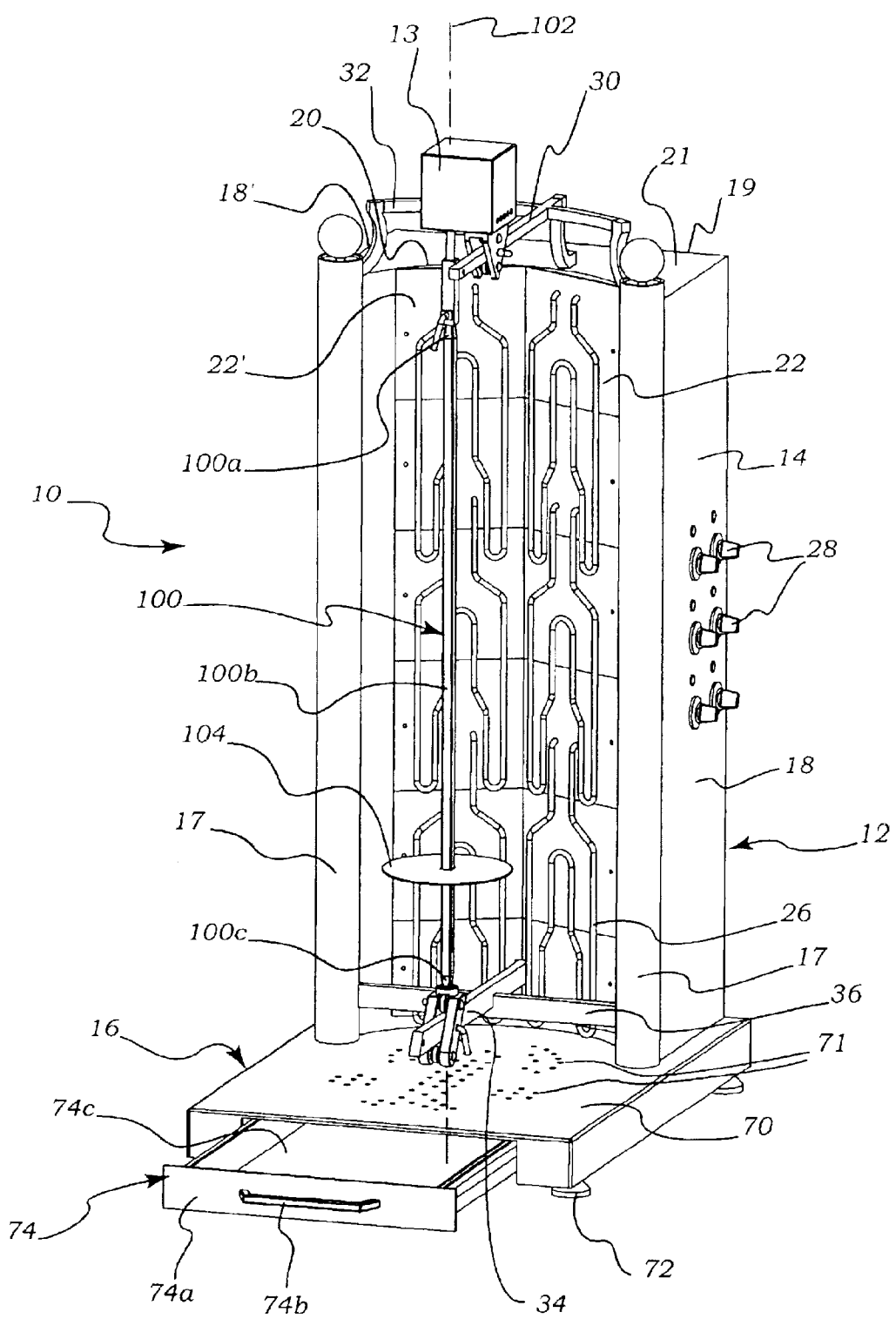
FIG. 1 is a front perspective view of the rotisserie device.

FIG. 1 illustrates a rotisserie device 10 according to the invention. Rotisserie device 10 is used for roasting meat, as described hereinafter.

Figure 4:
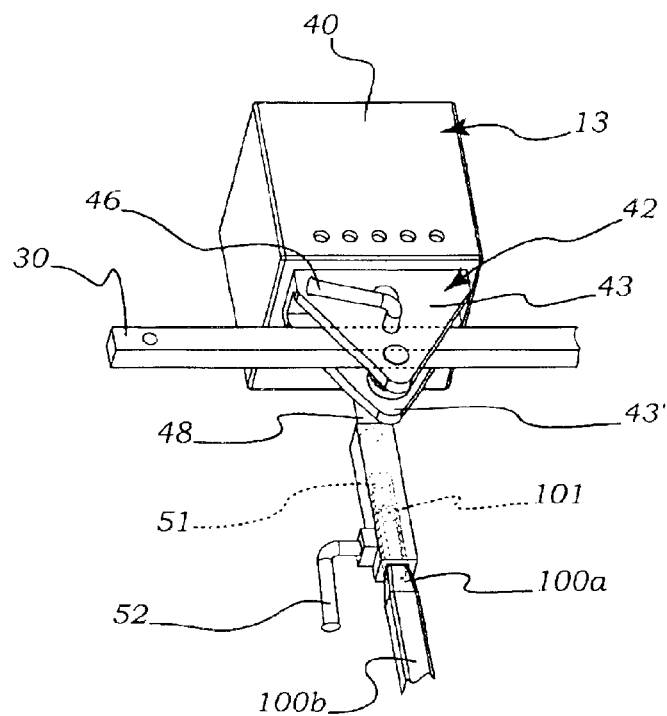
FIG. 4 is an enlarged side perspective view illustrating the top spit attachment assembly, a portion of the top elongated guiding track, and a top portion of the spit.

Rotisserie device 10 comprises an elongated spit 100 rotatably mounted on a casing 12. Spit 100 is shown to be cross-sectionally square, although it is understood that it could have other cross-sectional shapes, e.g. circular, and defines a top end portion 100a coaxially projecting from the top of a main meat-carrying portion 100b, and a bottom end portion 100c coaxially projecting from the bottom of main portion 100b; a longitudinal rotation axis 102 extends centrically along spit 100. End portions 100a, 100b are cross-sectionally peripherally narrower than main portion 100b; moreover, as shown in FIG. 4, top end portion 100a defines a spiky extremity 101, which is useful when skewering meat on spit 100, as described hereinafter.

As shown in FIG. 1, a disk-like platter 104 is coaxially fixedly carried by spit main portion 100b. In one embodiment, platter 104 could releasably and slidably engage spit portion 100b, and its vertical axial position relative to spit main portion 100b could be adjusted. Spit 100 and platter 104 are made of a rustproof material, for example stainless steel.

Casing 12 comprises a vertical main portion 14 fixedly mounted atop a horizontal ground-resting base 16; base 16 is perpendicular to and extends frontwardly beyond casing main portion 14.

Casing horizontal base 16 has a parallelepiped-like shape. Base 16 comprises a removable residue-collecting drawer 74 slidable within base 16 between an opened position (FIG. 1) and a closed position (FIG. 5). Drawer 74 comprises a front panel 74a, a handle 74b attached to front panel 74a, and further comprises a residue container 74c. Residue container 74c is intended to collect cooking residues such as grease drippings, for ulterior disposal thereof. The top surface of base 16 is a work plate 70 having grease-dripping perforations 71 thereon; perforations 71 are positioned on plate 70 in order to be located directly over residue container 74c of drawer 74 when the latter is in its closed position. Accordingly, residues falling onto plate 70, such as liquefied meat fat, can pass through perforations 71 and be collected in residue container 74c.

Base 16 is also provided, at the four corners of its bottom face, with four feet 72, which can be for example provided with suction-pads to maintain rotisserie device 10 onto a kitchen table in a firm, yet releasable manner.

Casing main portion 14 generally comprises two elongated sheet-like rectangular parallel side walls 18, 18', and further comprises a sheet-like elongated rectangular back wall 19 integrally extending perpendicularly between registering lateral edges of walls 18, 18'. Main portion 14 also comprises an elongated hemicylindrical front wall 20, which integrally extends between side walls 18, 18', in an outwardly concave fashion. The vertical lateral edges of concave wall 20 are joined to registering lateral edges of sides walls 18 and 18' at vertical cylindrical chimneys 17. Moreover, a top wall 21 is fixed at its peripheral edges to side walls 18, 18', back wall 19 and front concave wall 20. Walls 18, 18', 19, 20 and 21 are all made from a rust-proof material which can withstand high temperatures, for example stainless steel.

Vertical chimneys 17 are tubular, and extend through work plate 70 in order to come in fluid communication with residue container 74c. Chimneys 17 are intended to allow for gaseous emanations emitted by the warm residues contained in container 74c of drawer 74 to be more readily evacuated.

Figure 2:
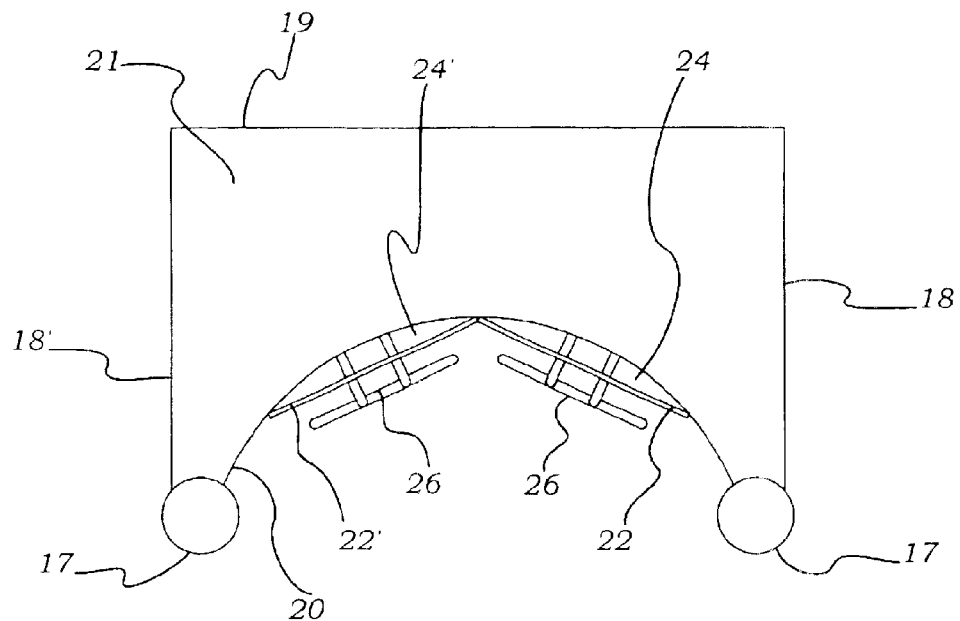
FIG. 2 is an enlarged partial top elevation of the rotisserie device of FIG. 1, showing particularly the hemicylindrical wall of its casing, its heating elements, and its heat reflecting plates.

Casing main portion 14 is also provided with pairs of horizontally-aligned heat reflecting plates 22, 22' (six pairs of plates 22, 22' are shown in the appended drawings). Pairs of plates 22, 22' are edgewisely vertically stacked. The vertical lateral edges of plates 22, 22' abut against and are releasably attached to the concave face of hemicylindrical wall 20, as can be seen in FIG. 2; this releasable attachment will allow for plates 22, 22' to be readily detached and cleaned manually in a sink or in a dishwasher, for example. One lateral edge of plate 22 is juxtaposed to a lateral edge of plate 22', and the union of two horizontally-aligned plates 22 and 22' thus has a V-shaped profile. Heat reflecting plates 22, 22' are made from a material having good heat resisting and reflecting capacities, such as stainless steel.

With further reference to FIG. 1, heat reflecting plates 22, 22' carry Y-shaped electric heating elements 26. Elements 26 are releasable from plates 22, 22', and can thereby be more readily cleaned. Elements 26 are connected to an electric power source (not shown), and to dials 28 located on side wall 18 of main portion 14. Each element 26 is independently connected to a corresponding dial 28; the heat intensity of elements 26 can be independently varied by adjusting the setting of their corresponding dial 28. In an alternate embodiment, all heating elements are connected to the same heat regulating dial, and their heat intensity is controlled synchronously by adjusting the setting on that single dial.

As shown in FIG. 2, each one of plates 22, 22' carrying elements 26 cross-sectionally forms a chord of the arcuate concave wall 20. Thus, two vertical air channels 24, 24' are formed between concave wall 20 and plates 22, 22'; a first vertical air channel 24 is formed between wall 20 and the vertically edgewisely stacked plates 22, and a second vertical air channel 24' is formed between wall 20 and the vertically edgewisely stacked plates 22'. Vertical air channels 24, 24' are interposed between heating elements 26 and casing front concave wall 20, and act as insulation means for diminishing the amount of heat transferred from heating elements 26 to front wall 20. Channels 24, 24' will thus help prevent overheating of the rotisserie device 10 due to heat radiated by elements 26.

As shown in FIGS. 1 and 5, casing main portion 14 is provided with a tripodal assembly 32 atop thereof; the central leg of tripodal assembly 32 is firmly secured to top wall 21 of casing main portion 14, and the two other legs are affixed to the top end portion of cylindrical chimneys 17. A cross-sectionally rectangular guiding track 30 integrally protrudes horizontally and frontwardly from the center of tripodal assembly 32, beyond front wall 20 of main portion 14.

Figure 3:
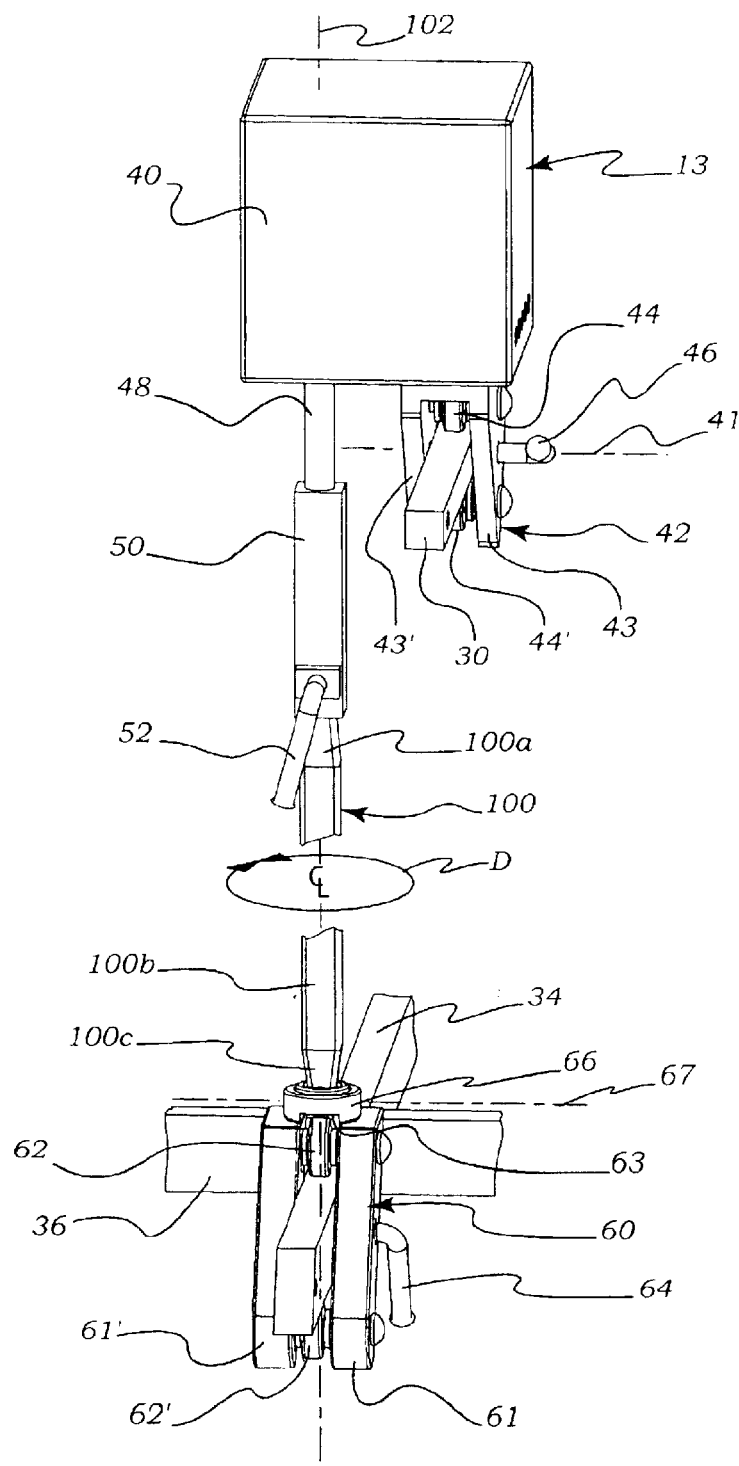
FIG. 3 is a partial enlarged perspective view illustrating the top spit attachment assembly, the bottom rolling member, and top and bottom portions of the spit, with a double-sided arrow suggesting the bidirectional rotary motion of the spit.

As illustrated in FIG. 3, a first joint member in the form of a top spit attachment assembly 13 is rollingly mounted on guiding track 30. Assembly 13 comprises a cubical motor housing 40, and a rolling member 42 whereby assembly 30 is rollingly mounted onto track 30. Rolling member 42 is firmly attached to the bottom face of cubical motor housing 40, adjacent one lateral edge thereof. Rolling member 42 comprises two spaced-apart side plates 43, 43' rollingly carrying two vertically registering rollers 44, 44', that are suitably vertically spaced-apart from each other to loosely accommodate guiding track 30 therebetween. Indeed, top and bottom rollers 44, 44' can engage the respective top and bottom flat faces of the cross-sectionally rectangular track 30. Rolling member 42, and thus also motor housing 40, can thereby be linearly rolled back and forth along track 30.

Attachment assembly 13 defines a tilt axis 41 extending transversely across rolling member 42; axis 41 is parallel to the bottom face of motor housing 40, and is perpendicular to track 30. When assembly 13 is not tilted, in the sense that the bottom face of motor housing 40 is parallel to guiding track 30, a play is present between at least one of rollers 44, 44' and guiding track 30. This play will provide assembly 13 with the liberty to be tilted frontwardly and backwardly about tilt axis 41. In an alternate embodiment (not shown in the drawings), rollers 44, 44' are vertically moveable within rolling member 42, and springs vertically bias rollers 44, 44' towards each other and against track 30. In this alternate embodiment, rollers 44, 44' constantly snugly engage track 30, but can recede vertically about their moveable engagement with rolling member 42 upon tilting of assembly 13 about axis 41.

Rolling member 42 comprises a set screw 46 having a handle portion perpendicularly extending from its threaded shank. Set screw 46 can selectively immobilize attachment assembly 13 relative to guiding track 30

Motor housing 40 comprises a motor (not shown) therein, for example powered by an electric power source; this motor can be selectively activated by means of a switch (not shown). A shaft 48 operatively and rotatably connected to the motor housed within motor housing 40 extends out of motor housing 40, from the bottom face thereof at the vicinity of the lateral edge opposite rolling member 42. Spit attachment assembly 13 further comprises a cross-sectionally square elongated spit attachment sleeve 50 coaxially carried by shaft 48; shaft 48 and sleeve 50 are fixedly attached to each other, and the rotation of shaft 48 engenders the rotation of sleeve 50. Sleeve 50 comprises a set screw 52 thereon. Set screw 52 has a handle extending perpendicularly to its threaded shank.

As shown in FIG. 4, sleeve 50 defines an inner cavity 51 therein; cavity 51 is cross-sectionally square, and is slightly peripherally broader than top end portion 100a of spit 100. Cavity 51 is appropriately dimensioned to snugly receive end portion 100a of spit 100 therein. Both cavity 51 and end portion 100a having correspondingly shaped rectangular cross-sections, end portion 100a engages cavity 51 of attachment sleeve 50 in a non-rotatable fashion; rotation of sleeve 50 hence engenders rotation of end portion 100a and thus rotation of spit 100, as suggested by double-sided arrow D of FIG. 3. To prevent accidental egress of spit portion 100a out of cavity 51 of sleeve 50, set screw 52 can selectively frictionally engage spit top end portion 100a.

FIGS. 1 and 3 show that a horizontal bottom cross-sectionally rectangular guiding track 34 is provided on main portion 14 at the vicinity of the lower end portion thereof, spacedly above work plate 70. An intermediate portion of track 34 rests on the center of a crossbar 36 that extends horizontally between and is fixedly attached to vertical chimneys 17. An inner end portion of track 34 extends through plates 22, 22' and through front wall 20, plates 22, 22' and wall 20 being accordingly recessed to accommodate one end of track 34 therethrough.

Track 34 is vertically aligned with and is parallel to track 30.

As shown in FIG. 3, a second joint member in the form of a bottom rolling member 60 rollingly engages track 34, and can thus be rollingly translated along track 34; rolling member 60 is suitably dimensioned, and sufficiently vertically spaced-apart from work plate 70, in order to steer clear from work plate 70 during such translation. Rolling member 60 comprises two parallel and horizontally spaced-apart fingers 61, 61' and a bridge 63 integrally extending between the top end of fingers 61, 61' perpendicularly thereto. Two spaced-apart rollers 62, 62' are rotatably attached to and between fingers 61, 61'. A L-shaped set screw 64, similar to set screws 46 and 52, is provided on finger 61, and can selectively immobilize rolling member 60 relative to track 34. Rolling member 60 further comprises a pivot joint 66 fixedly secured to the top surface of bridge 63.

Pivot joint 66 is dimensioned to receive bottom end portion 100c of spit 100, in a non-releasable fashion; pivot joint 66 will allow spit 100 to pivot at least about axis 102. In the embodiment shown in the drawings, pivot joint 66 is a universal joint. A spit tilt axis 67, parallel to crossbar 36 and perpendicular to track 34, extends through pivot joint 66. In an alternate embodiment, pivot joint 66 receives bottom end portion 100c of spit 100 in a releasable fashion.

It is to be noted that fingers 61, 61' are obliquely arranged relative to horizontal track 34; the purpose of such an oblique arrangement will be explained hereinafter.

To use rotisserie device 10, pieces of meat must first be skewered on spit 100. To do so, spit top end portion 100a is detached from sleeve 50. First, set screws 52, 46 and 64 are released, and top spit attachment assembly 13 and bottom rolling member 60 are then moved away from each other along top and bottom tracks 30, 34. More particularly, top attachment assembly 13 is rollingly moved along track 30, away from rolling member 60 and towards the free end of track 30, as suggested by arrow A in FIG. 5. As assembly 13 is moved away from bottom rolling member 60, the distance between assembly 13 and rolling member 60 progressively increases, and top end portion 100a of spit 100 progressively egresses out of cavity 51 of sleeve 50, until it is disengaged therefrom. To ease the disengagement of spit 100 out of sleeve 50, sleeve 50 can be tilted away from casing main portion 14, as suggested by arrow B on FIG. 6.

Once the top end portion 100a of spit 100 is completely freed from sleeve 50 and is spaced therefrom as shown in FIG. 6, a cook, or the like food preparer, can skewer meat onto spit 100. If need be, the cook can pivot spit 100 about its movable engagement on pivot joint 66 of bottom rolling member 60, and can thus arrange spit 100 in the most practical position to facilitate the skewering process. To stack meat along spit 100, a first piece of meat is pierced with spit spiky tip 101, and is slid along spit 100 towards platter 104, until is leans thereon. This process is repeated with multiple pieces of meat, which are stacked one above the other, until a meat piling M is formed, as illustrated in FIG. 7. Once the meat has been impaled onto spit 100, spit 100 is pivoted towards sleeve 50, and spit top end portion 100a is fitted and secured therein, by means of set screw 52.

By providing spit 100 with the capacity to be pivoted about pivot joint 66, the skewering process is greatly facilitated. Indeed, instead of detaching the entire spit 100 from device 10 prior to loading it with meat, spit 100 is detached from sleeve 50 only at its top end portion 100a, and is then loaded with meat. Spit 100 is thus continuously supported at its bottom end portion 100c by rolling member 34 during the skewering process; this is advantageous in that the cook does not have to entirely manually support spit 100, which increases in mass as meat piling M is being set up on it. Moreover, instead of having to reattach spit 100 one end at a time onto the rotisserie device, as is required to do on traditional rotisserie devices, it can simply be tilted back towards sleeve 50 and reattached thereto once the skewering process is completed.

After the meat has been skewered onto spit 100, the setting of dials 28 is adjusted to select the amount of heat released from heating elements 26, and the motor housed inside motor housing 40 is switched on, to drive shaft 48, sleeve 50, and thus spit 100, in a slow rotary motion relative to heating elements 26.

With rotisserie 10 of the invention, many parameters can be selectively adjusted to customize the cooking procedure. First, the setting on the heating dials 28 can be varied. Moreover, the distance and inclination of spit 100, and thus of meat piling M, relative to heating elements 26 can be adjusted, as detailed hereinbelow.

Top spit attachment assembly 13 and bottom rolling member 60 represent the two attachment points of spit 100 on casing 12; by translating them relative to heating elements 26, the distance between the meat piling M and heating elements 26 can be varied. To do so, set screws 46 and 64 are released, to allow free rolling displacement of rolling members 42 and 60 respectively about tracks 30 and 34 respectively. Both top spit attachment assembly 13 and bottom rolling member 60 can then be translated away or towards casing main portion 14, to translate spit 100 towards or away from heating elements 26.

Also, spit 100 can be tilted relative to heating elements 26. When sleeve 50 of assembly 13 is in vertical register with pivot joint 66 of bottom rolling member 60, spit 100 stands vertically on casing 12; hence, in order for spit 100 to be tilted relative to elements 26, assembly 13 must be vertically unaligned with rolling member 60. Therefore, to tilt spit 100 relative to the heating elements 26, set screw 46 and/or set screw 64 are released, after the motor contained inside housing 40 has been switched off, and assembly 13 is rollingly displaced along track 30, and/or bottom rolling member 60 is rollingly displaced along track 34, in order to place sleeve 50 and joint 66 in a vertically unaligned relative position, as shown for example in dotted lines in FIG. 5. Then, set screws 46 and/or 64 are tightened and the motor contained inside housing 40 can be switched back on, and spit 100 can continue to revolve about rotation axis 102 in this tilted position.

To accommodate such tilting of spit 100, on one hand, spit 100 will pivot about bottom axis 67, by means of pivot joint 66. On the other hand, as described above, assembly 13 will be tilted about top axis 41. Also spit top end portion 100a will slide within sleeve 50 to compensate the length difference between a shorter vertical position of spit 100 when top assembly 13 and bottom rolling member 60 are vertically aligned, and a longer inclined position of spit 100 when top assembly 13 and bottom rolling member 60 are vertically offset.

Spit 100 being provided with the capacity to be rotated in a tilted position relative to heating elements 26, rotisserie device 10 is provided with great advantages over known rotisserie devices. As mentioned in the "background on the invention" section of the present specification, meat piling M, after is has been repeatedly carved or shaved by a cook to prepare meat servings, often becomes inversely conical in shape, as shown in FIG. 8; the top portion of meat piling M is thus peripherally larger than the bottom portion thereof. If spit 100 stands vertically on casing 12, the top portion of meat piling M is hence closer to the heating elements 26, and can be subject to overheating. To prevent such overheating and thus possible carbonization of the superficial layer of the top portion of meat piling M, spit 100 can be tilted relative to heating elements 26. Hence, the whole length of the outer superficial layer of meat piling M can be equidistant from heating elements 26 when spit 100 revolves about rotation axis 102 in a tilted position relative to elements 26.

The rotisserie device 10 as described herein is thus provided with a highly customizable position relative to heating elements 26.

During the meat roasting process, liquefied meat fat is likely to be released from meat piling M. Under the influence of gravity, this liquid fat will drip onto work plate 70, and leak through perforations 71 of work plate 70c, in order to be collected in container 74c of drawer 74. Such residues collected inside container 74c are constantly subjected to heat coming from heating elements 26, and are thus likely to slowly evaporate and emit gaseous emanations; these emanations are evacuated through the instrumentality of chimneys 17, which are in fluid communication with container 74c. Drawer 74 can be selectively removed from base 16, and the content of container 74c can be disposed of.

Once the pieces of meat have been piled up about spit 100, meat piling M is formed, which can have an important mass. Accordingly, components of rotisserie 10 which will bear this heavy mass are of robust construction; namely, rolling member 60 and track 34 are duly constructed to support the gravity-borne heavy weight of the meat-loaded spit 100. It has been specified hereinabove that fingers 61, 61' of bottom rolling member 60 are inclined relative to track 34. This inclined arrangement provides considerable stability to the rolling engagement of rolling member 60 about track 34; indeed, the weight of the meat-loaded spit 100 is applied at an off-centered point on rolling member 60, and a moment of force thereby biases rolling member 60 in rotation, as illustrated by an arrow C in FIG. 7. Thus, the weight of spit 100 is not only carried by the top roller 62 of rolling member 60, but is rather distributed between the top roller 62, which forcefully engages the top face of track 34, and the bottom roller 62', which forcibly engages the bottom face of track 34, to counterbalance the weight of spit 100 and its meat-load. The position of spit 100 can also be adjusted by pivoting fingers 61, 61'.

Moreover, it is to be noted that track 34 defines a rectangular cross-section, with the longer side of that rectangular cross-section oriented vertically. Such arrangement provides track 34 with high resistance to flexion efforts, to which it is subjected when spit 100 carries a heavy meat piling M.

What is claimed is:

1. A rotisserie device for cooking meat, comprising:

a casing;

at least one heating element mounted to a heating surface of said casing;

an elongated rotatable spit located in spaced facing register with said heating surface, said spit defining opposite first and second end portions;

a first joint member carried by said casing and movable along a first axis towards and away from said heating elements, and pivotable about a second axis perpendicular to said first axis, said spit front end portion being rotatably carried by said first joint member; and a second joint member carried by said casing and movable along a third axis towards and away from said heating surface, said third axis being parallel to said first axis, said second joint member being pivotable about a fourth axis perpendicular to said third axis and parallel to said second axis, said spit second end portion being rotatably carried by said second joint member.

2. The rotisserie device as in claim 1, further comprising a power device operatively connected to said spit, wherein said power device can be selectively activated for driving said spit into rotation.

3. The rotisserie device as in claim 1, wherein said casing further comprises first and second spaced-apart tracks, extending along said first and third axes respectively, said first track slidably carrying said first joint member, and said second track slidably carrying said second joint member.

4. The rotisserie device as in claim 3, further comprising first and second rolling members, said first joint member being attached to said first rolling member and said first rolling member rollingly and slidably engaging said first track, said second joint member being attached to said second rolling member and said second rolling member rollingly and slidably engaging said second track.

5. The rotisserie device as in claim 1, wherein said spit further comprises a platter attached to an intermediate portion thereof in a perpendicular fashion, for longitudinally supporting food skewered on said spit.

6. The rotisserie device as in claim 1, wherein said casing comprises a residue-collecting drawer underlying said spit, for collecting cooking residues.

7. A rotisserie device for cooking meal, comprising:

a casing;

first and second parallel elongated guiding tracks protruding from and attached to said casing;

a first joint member and a second joint member, said first joint member displaceably engaging said first guiding track, and said second joint member displaceably engaging said second guiding track;

a number of heating elements mounted to said casing;

an elongated spit defining a first end and a second end, said spit first end rotationally connected to said casing at said first joint member, and said spit second end rotationally connected to said casing at said second joint member, said spit being rotationally mounted to said casing in facing register with said heating elements;

wherein said first joint member can be displaced about said first guiding track, and said second joint member can be displaced about said second guiding track, in order to displace said spit relative to said casing.

8. The rotisserie device as in claim 7, further comprising a motor operatively connected to said spit, wherein said motor can be selectively activated to drive said spit into slow rotary motion.

9. The rotisserie device as in claim 8, further comprising first and second rolling members, said first joint member being attached to said first rolling member and said first rolling member rollingly engaging said first track, said second joint member being attached to said second rolling member and said second rolling member rollingly engaging said second track.

10. The rotisserie device as in claim 8, wherein said spit further comprises a platter attached to an intermediate portion thereof in a perpendicular fashion, for longitudinally supporting food skewered on said spit.

11. The rotisserie device as in claim 8, wherein said casing comprises a residue-collecting drawer underlying said spit, for collecting cooking residues.

* * * * *